(12) United States Patent
Couts et al.

(10) Patent No.: US 7,668,915 B2
(45) Date of Patent: Feb. 23, 2010

(54) SYSTEM AND METHOD FOR RESPONDING TO A COMMUNICATION MESSAGE WITH A CANNED REPLY

(75) Inventors: Jeffrey Couts, Ft. Worth, TX (US); Uday Sagi, Ft. Worth, TX (US); Dwight R. Smith, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 1408 days.

(21) Appl. No.: 10/027,163

(22) Filed: Dec. 20, 2001

(65) Prior Publication Data

US 2003/0120732 A1 Jun. 26, 2003

(51) Int. Cl.
G06F 15/16 (2006.01)

(52) U.S. Cl. .................. 709/206; 709/201; 709/204; 709/207

(58) Field of Classification Search .................. 709/224, 709/205, 207, 204, 206, 201
See application file for complete search history.

(56) References Cited

U.S. PATENT DOCUMENTS

| | | | |
|---|---|---|---|
| 4,677,663 A | 6/1987 | Szlam | |
| 5,479,476 A | 12/1995 | Finke-Anlauff | |
| 5,559,860 A | 9/1996 | Mizikovsky | |
| 5,579,375 A | 11/1996 | Ginter | |
| 5,752,191 A | 5/1998 | Fuller et al. | |
| 6,005,870 A | 12/1999 | Leung et al. | |
| 6,147,977 A | 11/2000 | Thro et al. | |
| 6,249,815 B1 | 6/2001 | Foladare et al. | |
| 6,260,148 B1 | 7/2001 | Aggarwal et al. | |
| 6,301,609 B1 * | 10/2001 | Aravamudan et al. | 709/207 |
| 6,430,604 B1 * | 8/2002 | Ogle et al. | 709/207 |
| 6,584,494 B1 * | 6/2003 | Manabe et al. | 709/204 |
| 6,784,899 B1 * | 8/2004 | Barrus et al. | 715/717 |
| 6,993,564 B2 * | 1/2006 | Whitten, II | 709/207 |
| 2003/0191808 A1 * | 10/2003 | Adler et al. | 709/207 |
| 2004/0048615 A1 * | 3/2004 | Kato et al. | 455/435.1 |

* cited by examiner

*Primary Examiner*—William C Vaughn, Jr.
*Assistant Examiner*—Djenane M Bayard
(74) *Attorney, Agent, or Firm*—Hisashi D. Watanabe (57) ABSTRACT

The present invention is a data network system (110) and method for responding to a communication message with a canned reply by a target user of a target client device (one of 102-108). The data network system comprises a messaging server (112) and a messaging proxy (120) coupled to the messaging server. Initially, the target client device or, more particularly, the target user, configures one or more canned replies for the system. The messaging proxy then receives (204, 304, 404) a communication message from an originating client device (another one of 102-108) and retrieves (206, 306, 406) configuration data of the target client device. Next, the messaging proxy determines (208, 308, 408) whether the target client device is available for interactive communication with the originating client device based on the configuration data. If the target client device is available for interactive communication with the originating client device, then the messaging proxy routes (210, 310, 410) the communication message to the target client device. Otherwise, if the target client device is not available for interactive communication with the originating client device, then the system withholds (230, 330, 430) the communication message from the target client device and sends (230, 330, 430) the canned reply to the originating client device.

20 Claims, 4 Drawing Sheets

SYSTEM AND METHOD FOR RESPONDING TO A COMMUNICATION MESSAGE WITH A CANNED REPLY

FIELD OF THE INVENTION

The present invention relates generally to the field of messaging systems and, more particularly, to an instant messaging system and method for responding to a communication message with a canned reply by a user of a client device.

BACKGROUND OF THE INVENTION

An instant messaging ("IM") system generally includes a plurality of client devices coupled to a server or servers of a data network. The client devices typically provide the ability to track and display the presence status of other users connected to the server of the data network. Presence status about other users is organized into contact lists or buddy lists. Each entry in the contact list corresponds to a user of the IM system, or more specifically the user's client device, and includes presence status associated with each entry. Users of the client devices desire up-to-date presence status about the members of their contact list. Although presence information may be passed on a client device, more typically the presence information is associated with a predetermined presence status, such as online or off-line, that is passed on to the client device.

IM systems are designed to handle real-time communications between client devices and do not typically provide features for dealing with users who are off-line or otherwise unavailable for interactive communication. IM users are expected to contact users on their contact lists who are online and available to communicate while ignoring other users who are not available. Thus, IM systems generally are not designed to provide automatic replies to incoming messages sent to unavailable users.

E-mail systems are known to send e-mail replies automatically to incoming e-mail messages, whether or not the target users are available. For example, the Microsoft® Outlook® application by Microsoft Corporation of Redmond, Wash., includes an "Out of Office Assistant" feature that sends an e-mail reply automatically in response to an incoming e-mail message. The e-mail reply is typically customized, in advanced, by the user of the Outlook application based on information contained within the incoming e-mail message. Thus, such e-mail servers and applications are limited since their replies are based only on information contained within each incoming e-mail message.

Accordingly, there is a need for a more informative system for communicating among users and their client devices. More particularly, there is a need for a messaging system that provides replies automatically about a target device that are customized for an originating device based on additional configuration data, particularly information about the originating and/or target device, such as presence and location information, as well as the incoming messages themselves.

SUMMARY OF THE INVENTION

The present invention is a method for a data network system for responding to a communication message with a canned reply by a target user of a target client device. Initially, the target client device or, more particularly, the target user, configures one or more canned replies for the system. The system then receives a communication message from an originating client device and retrieves configuration data of the target client device. Next, the system determines whether the target client device is available for interactive communication with the originating client device based on the configuration data. If the target client device is available for interactive communication with the originating client device, then the system routes the communication message to the target client device. Otherwise, if the target client device is not available for interactive communication with the originating client device, then the system withholds the communication message from the target client device and sends the canned reply to the originating client device.

The present invention is also a data network system for responding to a communication message with a canned reply by a target user of a target client device. The data network system comprises a messaging server and a messaging proxy coupled to the messaging server. Although the messaging proxy may be incorporated in the messaging server, the messaging proxy and the messaging server are preferably separate components. The messaging server communicates with a plurality of client devices and is capable of routing the communication message from an originating client device to the target client device. The messaging proxy is capable of directing the messaging server. If the target client device is available for interactive communication with the originating client device, then the messaging proxy directs the messaging server to route the communication message to the target client device. If the target client device is not available for interactive communication with the originating client device, then the messaging proxy withholds the communication message from the target client device and sends the canned reply to the originating client device without routing the communication message to the target client device.

DETAILED DESCRIPTION OF THE PREFERRED EMBODIMENTS

The present invention is a data network system for responding to a communication message, received from an originating device operated by an originating user, with a canned reply that is sent to a target device operated by a target user. The target user may configure one or more canned replies and corresponding rules, in advance, for subsequent use in responding to incoming communication messages from the originating device. When the system receives a particular communication message from the originating device that is intended for the target device, the system retrieves configuration data of the target device and determines whether the target device is available. The configuration data includes the canned replies and rules pre-configured by the target user. The system also retrieves status information about the originating device and/or the target device, such as, for example, the identity of the originating device (if not known from the communication message) and the location of the target device. By comparing the status information against the configuration data, the system is able to determine whether the target device is available. If the target device is available, then the system delivers the communication message to the target device. On the other hand, if the target device is not available, then the system withholds the communication message from the target device and sends an appropriate canned reply to the originating device.

As stated above, the data network system determines whether a target device is available or unavailable. A target device is considered to be unavailable if one or more pre-configured rules configured by the target user apply to a given situation. Preferably, the target user configures canned replies and rules for all, or substantially all, possible situations in which the target device would be unavailable. For example, a target device would configure canned replies and rules for situations where the target device is off-line or otherwise cannot provide a real-time response to incoming communication messages. The target device may not be able to provide a real-time response for various reasons, such as being outside of a defined area or being manually set by the target user as unavailable. On the other hand, a target device is considered to be available if none of the pre-configured rules configured by the target user apply to a given situation. For example, a target device would not configure canned replies and rules of situations where the target device is online and can provide a real-time response to incoming communication messages.

In a situation where the target device is off-line, the target device is not available regardless of whether a pre-configured rule exists of such situation. Preferably, if the target user has not configured a canned reply associated with the target device being off-line, then the incoming communication message is withheld from the target device and no canned reply is sent to the originating device.

As stated above, the target user may pre-configure one or more canned replies and rules, and such rules may be compared to status information of the originating device and/or target device to determine whether a target device is available. If the target user has pre-configured more than one canned reply, then these rules may also determine which canned reply should be sent to the originating device. Preferably, the target user configures each canned reply with rules for configuration of the originating device, rules for configuration of the target device and/or rules for other considerations. For example, the target user may associate each canned reply with an individual classification (i.e., an individual user), a group classification of users, or a default classification of users of the originating device. Groups of users include, but are not limited to, co-workers or business associates (e.g., "work buddies"), social eating and/or drinking companions (e.g., "beer buddies"), and acquaintances sharing a common hobby or interest (e.g., "baseball buddies"). As another example, the target user may associate each canned reply with a location of the target device, such as region 1, region 2, etc.

Figure 1:
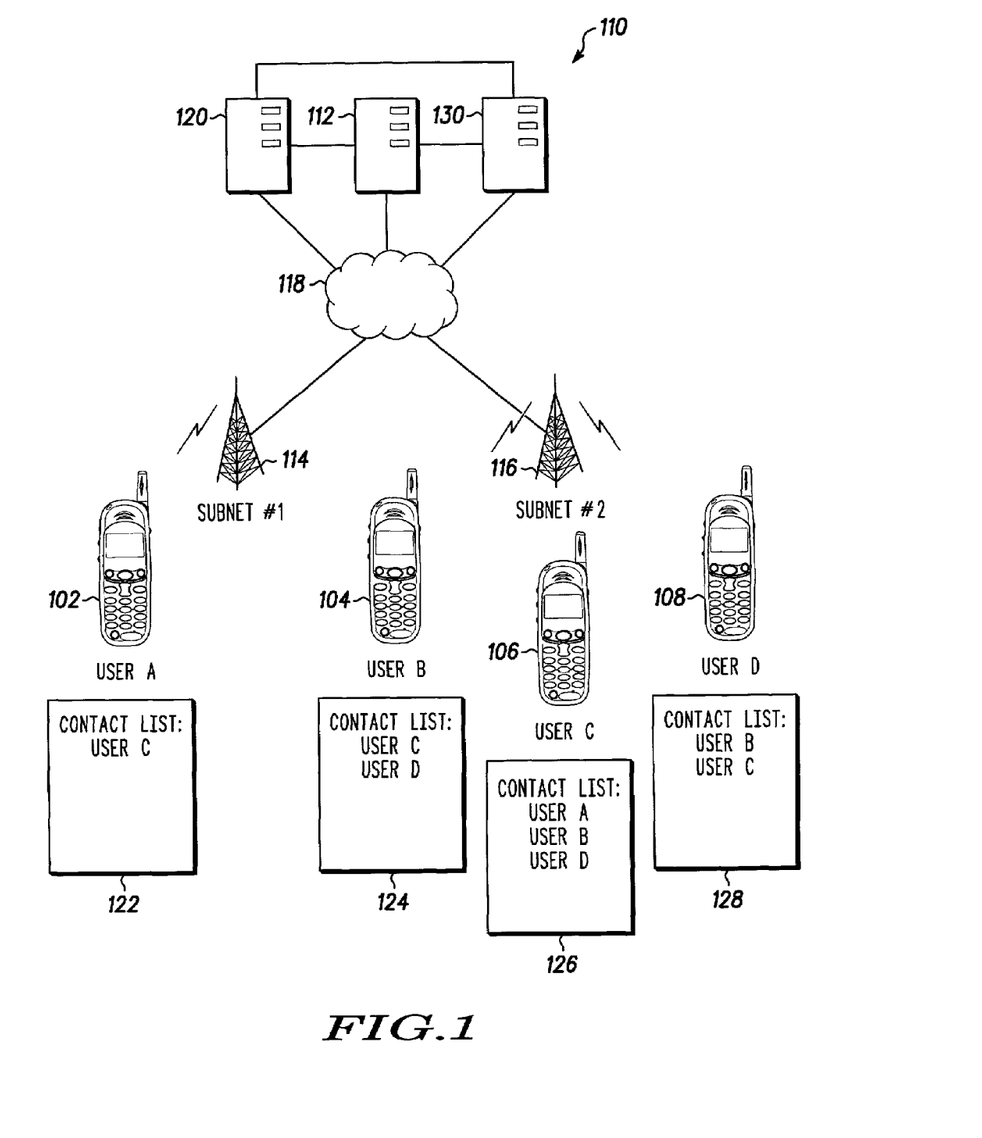
FIG. 1 is a block diagram representing a preferred embodiment that may be adapted to operate in accordance with the present invention.

Referring to FIG. 1, there is shown a preferred embodiment of the system of the present invention. The preferred embodiment includes a plurality of client devices 102, 104, 106, 108 associated with a data communication network 110. For purposes of illustration, the communication network 110 includes a messaging server 112, two radio subnetworks (namely subnetwork #1 114 and subnetwork #2 116), and connectivity network 118 between the client devices 102, 104, 106, 108 and the messaging server. It is to be understood that the present invention may also be applied to a different configuration of client devices and a communication network, such as a plurality of servers or connection to a wired network. The client devices 102, 104, 106, 108 and the messaging server 112 each include a processor for general operation of the messaging server and a memory for storage of applications and data.

For the example represented by the preferred embodiment, the four client devices 102, 104, 106, 108 are labeled User A, User B, User C, and User D respectively. User A's client device 102 is on a separate radio subnetwork 114 from the subnetwork 116 of the other client devices 104, 106, 108. User B's, User C's and User D's client devices 104, 106, 108 can receive communications sent by a base station of subnetwork #2 116 and are on a separate radio subnetwork 114 from User A's client device 102. In practical situations, there will be many more radios, subnets and contact (or buddy lists).

The client devices 102, 104, 106, 108 of the preferred embodiment shown in FIG. 1 are radiotelephones for communication using a wireless communication system, such as a standard cellular telephone system. Although the preferred embodiment described herein utilizes radiotelephones, one skilled in the art will recognize that the features discussed will also find application in other types of client devices such as cordless telephones, personal digital assistants, two-way radios, pagers, portable computers, multi-functional communication devices and the like.

The preferred embodiment also includes a messaging proxy 120 that operates on behalf of a user by establishing a connection to the messaging server 112 and responding accordingly. The messaging proxy is coupled to one or both of the following components: the messaging server 112 and the connectivity network 118. As shown in FIG. 1, the messaging proxy 120 may run from an independent server to act as the user and be invoked by the user as needed. Also, the messaging proxy 120 can operate as a gateway proxy to maintain a persistent connection on the user's behalf. All messaging traffic is communicated through the gateway and enabled by the user directly, such as enabling an "off-line" mode while remaining on the network, or automatically if the gateway proxy is unable to communicate with the user's client device. In the alternative, the messaging proxy 120 may be incorporated within the messaging server 112, thus the messaging proxy and messaging server act as a single unit.

Each client device 102, 104, 106, 108 includes at least one contact list 122, 124, 126, 128 (a.k.a. a buddy list, in the case of an instant messaging system) that is capable of identifying one or more of the other client devices connected to the communication network 110. Each contact list 122, 124, 126, 128 may identify none, some or all of the client devices 102, 104, 106, 108 connected to the communication network 110. A particular client device 102, 104, 106, 108 would include a contact list 122, 124, 126, 128 that identifies other client devices. In FIG. 1, the contact lists 122, 124, 126, 128 are shown beneath the client devices 102, 104, 106, 108. However, for the present invention, each contact list 122, 124, 126, 128 is stored in a memory of the respective client device 102, 104, 106, 108, or collectively stored in a memory located in the communication network 110. For the preferred embodiment, the contact lists 122, 124, 126, 128 are stored in a memory of the messaging server 112. The contact lists 122, 124, 126, 128 may also identify a group or collection of users in addition to, or instead of, individual users. In addition, each client device 102, 104, 106, 108 may have more than one contact list.

For the preferred embodiment, users of the client devices 102, 104, 106, 108 utilize client software stored by the client devices that displays the status of other users connected to the communication network 110. Each entry of the contact lists 122, 124, 126, 128 corresponds to another user or, more particularly, another client device 102, 104, 106, 108 connected to the communication network 110. Information about the status of the user and/or client device 102, 104, 106, 108 may be associated with each entry. Presence status is generally dynamic in nature, changing over time based on various factors and conditions. Thus, updates to the presence status are transmitted to relevant client devices 102, 104, 106, 108 to update their respective contact lists 122, 124, 126, 128.

In some environments, a collection of users may have similar, if not identical, contact lists 122, 124, 126, 128. For example, a circle of friends may list each other in their contact lists 122, 124, 126, 128, possibly along with other people. In a work environment, work team members may include each other in their contact lists 122, 124, 126, 128, such as a "work buddies" contact list. In some work team environments, the contact lists 122, 124, 126, 128 will be identical amongst all members of the team.

The preferred embodiment may further include a location register 130, such as a mobile switching center ("MSC") and/or a visitor location register ("VLR"). The location register 130 is coupled to at least one of the components: the messaging server 112, the connectivity network 118 and the messaging proxy 120. The location register 130 is capable of routing calls to and from the client devices 102, 104, 106, 108 as well as tracking location information of the client devices. The location register 130 may determine location information, directly or indirectly via the client devices 102, 104, 106, 108, using a variety of techniques including, but not limited to, a global positioning system ("GPS") technique, a forward link trilateration ("FLT") technique, an advanced forward link trilateration ("AFLT") technique, an amplitude difference angle of arrival ("AD-AOA") technique, and an enhanced observed time difference ("EOTD") technique. The location register 130 may also determine the positions of the client devices 102, 104, 106, 108 from another entity via a wireless communication link, such as Bluetooth™ wireless technology which is supported by the Bluetooth™ Special Interest Group, HomeRF™ which is supported by the HomeRF™ Working Group, and Wi-Fi (IEEE 802.11b) which is supported by the Institute of Electrical and Electronics Engineers and the Wireless Ethernet Compatibility Alliance.

Figure 2:
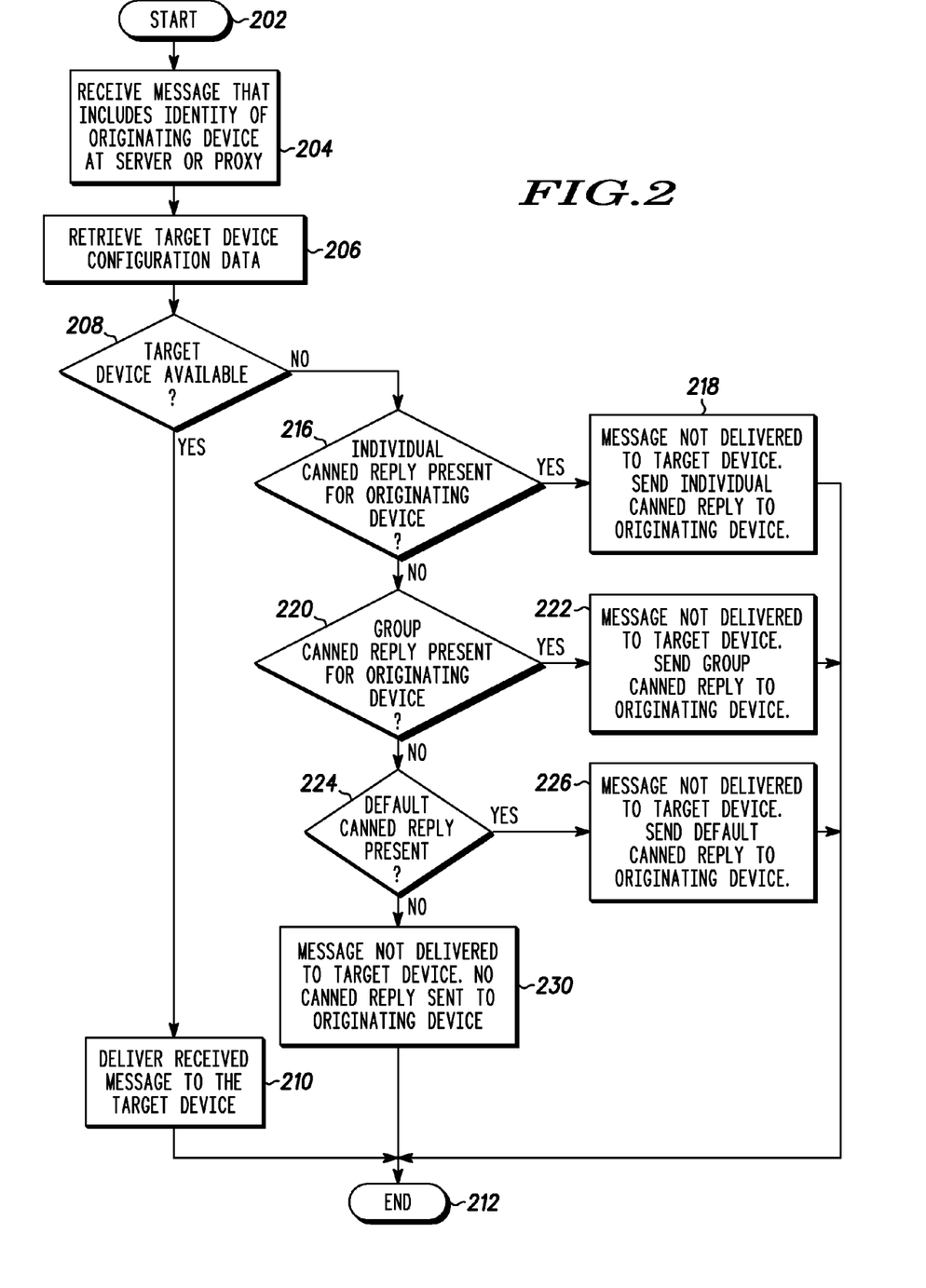
FIG. 2 is a flow diagram representing a first preferred method for responding to communication messages that may be adapted to operate in accordance with the preferred embodiment of FIG. 1.

Referring to FIG. 2, there is provided a first preferred method for responding to a communication message with a canned reply that may be adapted to operate in accordance with the preferred embodiment described above. Before the method shown in FIG. 2 is executed, one or more canned replies and corresponding rules are configured for a particular client device. For example, the client device may include one or more individual canned replies, one or more group canned replies and/or one or more default canned replies. An individual canned reply is associated with a user, and a group canned reply is associated with a group of users. An individual canned reply is sent to the associated user when an inquiry or message is received from the user. A group canned reply is sent to a particular member of the associated group when an inquiry or message is received from the member. A default canned reply may be sent if an inquiry or message is received from someone who is not associated with an individual canned reply or a group canned reply. The individual, group and default canned replies may be custom-tailored by each individual user of a client device. Preferably, each canned reply should include some indication of how to contact the target user, when to contact the target user, where to contact the target user, and/or who to contact in lieu of the target user, but such information is not critical for the proper operation of the present invention.

For the first preferred method shown in FIG. 2, the canned replies and corresponding rules for the target device are directed to situations where the target user is unavailable. By reviewing the Presence of the target device and Classification of the originating device, as defined by the configuration data of the target device, the system may determine whether the target device is available. More particularly, if the target device is off-line or if the target device is online and the originating device belongs in an applicable Classification, then the target device is considered to be unavailable. Otherwise, if the target device is online and the originating device does not belong to an applicable Classification, then the target device is considered to be available. An example of such information provided in the configuration data of the target device is represented below in Table 1.

TABLE 1

Canned Replies and Rules for First Preferred Method

| Presence | Classification | Reported Status | Canned Reply |
| --- | --- | --- | --- |
| Online | Individual Canned Reply (e.g., Bob) | Unavailable | "Contact me on my cell phone @ <phone no.>." |
| Online | Group Canned Reply (e.g., Beer Buddies) | Unavailable | "Contact me on my pager @ <pager no.>." |
| Online | Default Canned Reply | Unavailable | "Contact me by e-mail <e-mail address>." |
| Off-line | <None> | Unavailable | <None> |

As shown in FIG. 2, after initiating the first preferred method at step 202, the messaging proxy 120 receives a communication message from an originating device, such as client devices 102, 104, 106, 108, in step 204. The communication message includes, among other things, the identity of the originating device. It is the intention of the originating client device to send the communication message to a target device, such as client devices 102, 104, 106, 108. Although the messaging proxy 120 is described herein as performing the steps of the methods represented by FIGS. 2 through 4, it is to be understood that these steps (or a portion thereof) may be performed in conjunction with, or instead by, the messaging server 112.

Next, in step 206, the messaging proxy 120 retrieves configuration data of the target device from a database. The database may be located at the messaging server 112, the messaging proxy 120, or shared between the two components. For the preferred embodiment, the database is located at the messaging proxy 120. The configuration data includes one or more canned replies and corresponding rules, as shown in Table 1 above, configured by the target device in advance of executing the steps shown in FIG. 2. In addition, the messaging proxy determines the status of the originating device, the status of the target device or the statuses of both devices, whichever status information is necessary to determine the availability of the target device. For the first preferred method, the messaging proxy 120 determines the Presence of the target device and is capable determining the identity of the originating device at step 206. However, for the first preferred method, the identity of the originating device is determined from the communication message received at step 204. The messaging proxy 120 then determines, at step 208, whether the target device is available for interactive communication by comparing the retrieved status information against the retrieved configuration data. For the preferred embodiment, the messaging proxy 120 is able determine that the target device is available when the target device is online and the originating device does not belong to an applicable Classification. The target device is not available when the device is off-line or the originating device belongs in an applicable Classification. If the target device is available, then the messaging proxy 120 will deliver the communication message to the target device at step 210. Thereafter, the method terminates at step 212.

If the target device is not available at step 208, then the messaging proxy 120 determines whether the originating device is associated with an individual canned reply present in the database in step 216. As stated above, the identity of the originating device may be determined from the incoming communication message. For example, if Bob's client device is the originating device, then the messaging proxy 120 determines whether an individual canned reply associated with Bob's client device is present. As shown in Table 1, the individual canned reply could be, for example, "Contact me on my cell phone @ <phone no.>." If the individual canned reply is present, then the individual canned reply is sent to the originating device in step 218 and the method terminates at step 212.

Similarly, if the originating device is not associated with an individual canned reply, then the messaging proxy 120 determines whether the originating device is a member of a group of devices associated with a group canned reply present in the database in step 220. For example, if the originating device belongs to a member of the beer buddies, then the messaging proxy 120 determines whether a group canned reply associated with the originating device is present. As shown in Table 1, the group canned reply could be, for example, "Contact me on my pager @ <pager no.>." If so, then the group canned reply is sent to the originating device in step 222 and the method terminates at step 212.

Likewise, if the originating device is not associated with an individual canned reply or group canned reply, then the messaging proxy 120 determines whether a default canned reply is present in the database at step 224. As shown in Table 1, the default canned reply could be, for example, "Contact me by e-mail <e-mail address>." If a default canned reply is present, then it is sent to the originating device in step 226 and the method terminates at step 212.

Otherwise, if the default canned reply (as well as the individual canned reply and the group canned reply) are not applicable to the originating device, then the originating device does not receive any type of canned reply from the messaging proxy 120 and the method terminates at step 212. For the first preferred method, a Presence of "off-line" would result in no canned message being delivered to the originating device.

For the preferred methods described herein, the canned replies may indicate alternative communication modes for contacting the target client device. The first canned reply may indicate a first communication mode for contacting the target client device, and the second canned reply may indicate a second communication mode for contacting the target client device in which the second communication mode being different from the first communication mode. For example, as represented by Table 1, the first communication mode may be a voice call sent to a cell phone call, and the second communication mode may be a text message, such as a page or e-mail message, sent to a pager or a wireless personal digital assistant.

Figure 3:
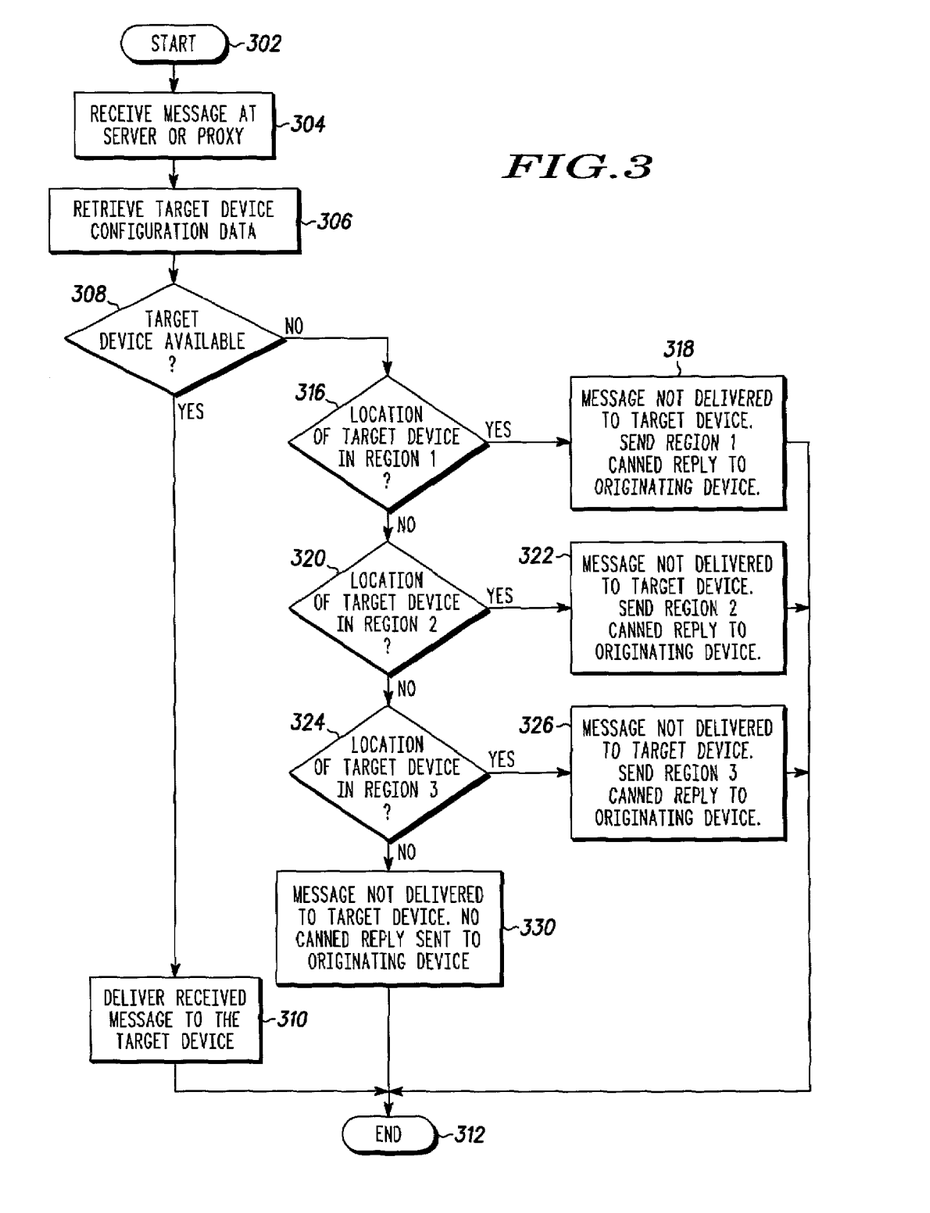
FIG. 3 is a flow diagram representing a second preferred method for responding to communication messages that may be adapted to operate in accordance with the preferred embodiment of FIG. 1.

Referring to FIG. 3, there is provided a second preferred method for responding to a communication message with a canned reply that may be adapted to operate in accordance with the preferred embodiment described above in reference to FIG. 1. The second preferred method is substantially similar to the first preferred method described above. The primary difference is that the first preferred method selects a particular canned reply based on rules for configuration of the originating device, namely the Classification of the originating device, whereas the second preferred method selects a particular canned reply based on rules for configuration of the target device, namely the location of the target device. By reviewing the Presence and location of the target device, as defined by the configuration data of the target device, the system may determine whether the target device is available. An example of such information provided in the configuration data of the target device is represented below in Table 2.

TABLE 2

Canned Replies and Rules For Second Preferred Method

| Presence | Location | Reported Status | Canned Reply |
| --- | --- | --- | --- |
| Online | Region 1 (e.g., Home Area) | Unavailable | "Contact me on my cell phone @ <phone no.>." |
| Online | Region 2 (e.g., Work Area) | Unavailable | "Contact me on my pager @ <pager no.>." |
| Online | Region 3 (e.g., Out-of-town) | Unavailable | "Contact me by e-mail <e-mail address>." |
| Off-line | <None> | Unavailable | <None> |

For the second preferred method, one or more canned replies and corresponding defined areas are configured for a particular client device before executing the method shown in FIG. 3. In operation, the client device sends one canned reply when the client device is located within the defined area and the client device sends a different canned reply when the client device is located outside of the defined area, i.e., in another defined area or otherwise not in the defined area. The location of the target device may be extracted from the configuration data of the target device or independently determined by the messaging proxy 120. For example, the user of the client device may wish to receive calls at one device when he or her is located within a particular city, but the user may wish to receive calls at another device when he or she is located outside of the particular city. As another example, the defined area may correspond to an operating range of another communication device associated with, or coupled by a wireless link to, the target client device. Also, as stated above, it is to be understood that the steps (or a portion thereof) shown in FIG. 3 may be performed by the messaging server 112, the messaging proxy 120, or both components. In addition, for the second preferred method, the location information is determined by the location register 130 and provided to the messaging server 112 and/or messaging proxy 120, and the database is located at the messaging proxy 120, as shown in FIG. 1.

After initiating the method at step 302, the messaging proxy 120 receives a communication message from an originating device, such as client devices 102, 104, 106, 108, in step 304. Next, in step 306, the messaging proxy 120 retrieves configuration data of the target device from a database. The configuration data includes one or more canned replies and corresponding rules, as shown in Table 2 above, configured by the target device in advance of executing the steps shown in FIG. 3. The messaging proxy 120 also retrieves status information of the originating device, the target device or both devices, whichever status information is necessary to determine the availability of the target device. For the second preferred method, the messaging proxy determines the Presence and location of the target device. The messaging proxy 120 then determines, at step 308, whether the target device is available for interactive communication by comparing the status information against the configuration data. For the preferred embodiment, the messaging proxy 120 is able determine that the target device is available when the target device is online and is not located within an applicable region, namely Region 1, Region 2 and Region 3. The target device is not available when the device is off-line or the target device is located within an applicable region, namely Region 1, Region 2 or Region 3. If the target device is available, then the messaging proxy 120 will deliver the communication message to the target device at step 310. Thereafter, the method terminates at step 212.

If the target device is not available, then the messaging proxy 120 checks whether the target device is located within a defined area, namely Region 1, at step 316. If the target device is located within Region 1, then a Region 1 canned reply is sent to the originating device in step 318, and the method terminates at step 312. If the target device is not located within Region 1, then the messaging proxy 120 checks whether the target device is located within another defined region, namely Region 2, at step 320. If the target device is located within Region 2, then a Region 2 canned reply is sent to the originating device in step 322, and the method terminates at step 312. If the target device is not located within Region 2, then the messaging proxy 120 checks whether the target device is located within Region 3 at step 324. If the target device is located within Region 3, then a Region 3 canned reply is sent to the originating device in step 326, and the method terminates at step 312.

Otherwise, if the target device is not within any of the designated regions, namely Regions 1, 2 or 3, then the originating device does not receive any type of canned reply from the messaging proxy 120 and the method terminates at step 212. For example, similar to the first preferred method, a Presence of "off-line" would result in no canned message being delivered to the originating device.

Figure 4:
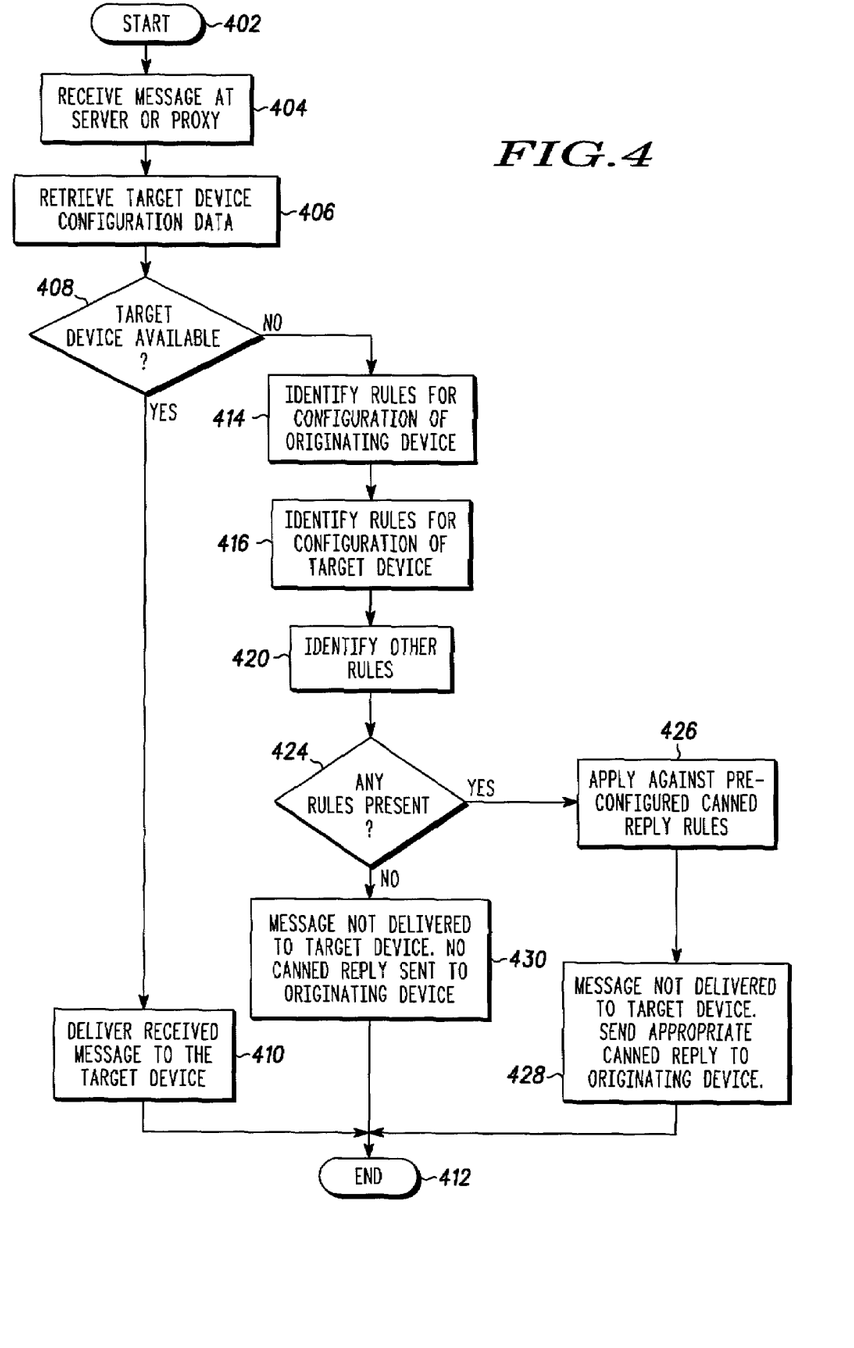
FIG. 4 is a flow diagram representing a third preferred method for responding to communication messages that may be adapted to operate in accordance with the preferred embodiment of FIG. 1.

Referring to FIG. 4, there is provided a third preferred method for responding to a communication message with a canned reply that may be adapted to operate in accordance with the preferred embodiment described above in reference to FIG. 1. The third preferred method might be considered to be a hybrid combination of the first and second preferred methods described above. In particular, the third preferred method selects a particular canned reply based on rules for configuration of the originating device and the target device. By reviewing the rules of configuration of the originating device and the target device, the system may determine whether the target device is available. An example of such information provided in the configuration data of the target device is represented below in Table 3.

TABLE 3

Canned Replies and Rules For Third Preferred Method

| Presence | Classification | Location | Reported Status | Canned Reply |
|---|---|---|---|---|
| Online | Individual Canned Reply | Region 1 | Unavailable | Canned Reply 1 |
| Online | Individual Canned Reply | Region 2 | Unavailable | Canned Reply 2 |
| Online | Individual Canned Reply | Region 3 | Unavailable | Canned Reply 3 |
| Online | Group Canned Reply | Region 1 | Unavailable | Canned Reply 4 |
| Online | Group Canned Reply | Region 2 | Unavailable | Canned Reply 5 |
| Online | Group Canned Reply | Region 3 | Unavailable | Canned Reply 6 |
| Online | Default Canned Reply | Region 1 | Unavailable | Canned Reply 7 |
| Online | Default Canned Reply | Region 2 | Unavailable | Canned Reply 8 |
| Online | Default Canned Reply | Region 3 | Unavailable | Canned Reply 9 |
| Off-line | <None> | <None> | Unavailable | Canned Reply 10 |

For the third preferred method, one or more canned replies and corresponding defined areas are configured for a particular client device before executing the method shown in FIG. 4. Also, the configuration data may include multiple canned replies and corresponding rules for configuration of the originating device and/or multiple canned replies and corresponding rules for configuration of the target device. As stated above, it is to be understood that the steps (or a portion thereof) shown in FIG. 4 may be performed by the messaging server 112, the messaging proxy 120, or both components.

After initiating the method at step 402, the messaging proxy 120 receives a communication message from an originating device, such as client devices 102, 104, 106, 108, in step 404. Next, in step 406, the messaging proxy 120 retrieves configuration data of the target device from a database. The configuration data includes one or more canned replies and corresponding rules, as shown in Table 3 above, configured by the target device in advance of executing the steps shown in FIG. 4. The messaging proxy 120 also retrieves status information of the originating device, the target device or both devices, whichever status information is necessary to determine the availability of the target device. The messaging proxy 120 then determines, at step 408, whether the target device is available for interactive communication such as, for example, by detecting whether the target client device is online and determining whether a rule of a pre-configured canned reply applies to the situation. If the target device is available, then the messaging proxy 120 will deliver the communication message to the target device at step 410. Thereafter, the method terminates at step 412.

If the target device is not available, then the messaging proxy 120 identifies any rules that are present for configuration of the originating device at step 414. Next, the messaging proxy 120 identifies any rules that are present for configuration of the target device at step 416. The messaging proxy 120 then identifies any other rules that have been pre-configured by the target user at step 420. Thereafter, the messaging proxy 120 determines whether any rules have been identified at steps 414, 416 and/or 420. If so, the messaging proxy applies the information from the communication message and/or the configuration data of the target device against the pre-configured canned reply rules identified at these previous steps at step 426. Based on the particular situation, the appropriate canned reply is sent to the originating device at step 428. For example, in reference to Table 3 above, <Canned Reply 1> would be sent to the originating device if the target device is online, the originating device is associated with an individual canned reply, and the target device is located in region 1. Thereafter, the method terminates at step 412. Otherwise, if none of the pre-configured canned reply rules can be applied to the target device, then the originating device does not receive any type of canned reply from the messaging proxy 120 and the method terminates at step 412.

The messaging proxy 120 may be used to set control for availability based on whether the originating device is a member of one or more associated contact lists of the target device. For example, a user may have several sets of buddies, such as "work buddies", "beer buddies" and "baseball buddies". During work hours, the "work buddies" may be the only group that receives true presence related information. In contrast, the "beer buddies" and "baseball buddies" groups may only receive limited information, such as the status indicator "at work", generated by the messaging proxy 120 on the user's behalf. This status indicator does not provide true presence related information, but would indicate that the target device is available to receive messages from the "beer buddies" and "baseball buddies" groups.

The messaging proxy 120 may also control the type of response provided to the originating device depending upon certain data, factors and conditions, such as the target device's contact list(s); the target device's specific location; the target member's location relative to the originating device, other devices and/or landmarks; the date/time-of-day that the incoming message is received; and the like. The messaging proxy 120 is the initial (and, perhaps, actual) recipient of the incoming message, the messaging proxy may review the originating source information (e.g., whether the originating user is on the "beer buddies" list) and follow a logic sequence based on current presence status and other information (e.g., current time-of-day and location). For example, if the target device is available, the incoming message arrives after 3:00 PM, and the target device is within a local city boundary, the incoming message from a "beer buddies" member may be routed directly to the target user with any reply expected from the user. If the target user is not available, but the user is (or believed to be) within the local city boundary, then the messaging proxy 120 may reply to the "beer buddies" member with a response like "<target user> is not available at this time, try calling <mobile phone number>". If the target user's location is outside of the local city boundary, then the messaging proxy 120 may respond with a response like "<user> is out-of-town, send email to <email address>". The rules for other groups, e.g., "baseball buddies", may be established separately.

While the preferred embodiment of the invention has been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for a data network system for responding to a communication message, the method comprising the steps of:
   receiving a communication message directed to a target device from an originating device, wherein the communication message includes an originating identification associated with the originating device;
   retrieving configuration data of the target device including a plurality of classes and a plurality of canned replies associated with the plurality of classes;
   determining whether the target device is available for interactive communication with the originating device;
   identifying an originating class of the originating device from the plurality of classes and a canned reply associated with the originating class based on the originating identification;
   routing the communication message to the target device if the target device is available for interactive communication with the originating device; and
   sending the canned reply to the originating device if the target device is unavailable for interactive communication with the originating device.

2. The method of claim 1, wherein the interactive communication is conducted in real-time between an originating user of the originating device and the target user of the target device.

3. The method of claim 1, wherein the step of determining includes the step of detecting whether an instant messaging application of the target device is active.

4. The method of claim 1, further comprising the step of configuring the canned reply by the target device before the step of receiving the communication message from the originating device.

5. The method of claim 1, wherein the step of sending the canned reply to the originating device includes the step of withholding the communication message from the target device.

6. The method of claim 1, further comprising the step of determining whether rules for configuration of the originating device exist.

7. The method of claim 6, further comprising the steps of routing a first canned reply to the originating device if the target device is in at least one classification of devices, and routing a second canned reply to the originating device if the target device is outside of the at least one classification of devices.

8. The method of claim 1, further comprising the step of determining whether rules for configuration of the target device exist.

9. The method of claim 8, further comprising the steps of routing a first canned reply to the originating device if a location of the target device is within a defined area, and routing a second canned reply to the originating device if the location of the target device is outside of the defined area.

10. The method of claim 1, further comprising the step of retrieving status information of at least one of the originating device and the target device, wherein the step of determining whether the target device is available for interactive communication includes the step of comparing the status information against the configuration data to determine whether the target device is available for interactive communication.

11. A data network system for responding to a communication message, the data network system comprising:
   a messaging server for communicating with a plurality of client devices, the messaging server being effective to receive a communication message directed to a target device from an originating device, retrieve a plurality of classes and a plurality of canned replies associated with the target device, identify an originating class of the originating device from the plurality of classes and a canned reply associated with the originating class based on the originating device, and send the canned reply to the originating device if the target device is unavailable for interactive communication with the originating device.

12. The data network system of claim 11, wherein the messaging server is incorporated within the messaging server.

13. The data network system of claim 11, wherein the target device includes an instant messaging application that is active.

14. The data network system of claim 11, further comprising a location register coupled to at least one of either the messaging server and the messaging server, the location register being effective to generate a current location of the target device.

15. The data network system of claim 11, wherein the communication message is withheld from the target device.

16. The data network system of claim 11, wherein the messaging server includes rules for configuration of the originating device.

17. The data network system of claim 16, wherein the messaging server includes a first canned reply that is sent to the originating device if the target device is in at least one classification of devices, and a second canned reply that is sent to the originating device if the target device is outside of the at least one classification of devices.

18. The data network system of claim 11, wherein the messaging server includes rules for configuration of the target device.

19. The data network system of claim 18, wherein the messaging server includes a first canned reply that is sent to the originating device if a location of the target device is within a defined area, and a second canned reply that is sent to the originating device if the location of the target device is outside of the defined area.

20. The data network system of claim 11, wherein the messaging server retrieves status information of at least one of the originating device and the target device and compares the status information against the configuration data to determine whether the target device is available for interactive communication.

* * * * *